United States Patent [19]

Coleman

[11] Patent Number: 4,491,253

[45] Date of Patent: Jan. 1, 1985

[54] CONTAINER WITH BUTTERFLY VALVE

[75] Inventor: Clarence B. Coleman, Oakland, Calif.

[73] Assignee: Fabricated Metals, Inc., San Leandro, Calif.

[21] Appl. No.: 368,140

[22] Filed: Apr. 14, 1982

[51] Int. Cl.³ .............................................. B65D 47/00
[52] U.S. Cl. .................................... 222/559; 251/328; 105/282 A
[58] Field of Search ............... 222/559, 544, 545, 556, 222/561; 141/363, 364; 251/193, 326, 329, 203, 328, 305-308, 170, 175; 277/34, 34.3, 34.6; 105/247, 248, 282 A, 282 R, 308 E, 308 C

[56] References Cited

U.S. PATENT DOCUMENTS

| | | | |
|---|---|---|---|
| 2,250,524 | 7/1941 | Dietrichson | 105/282 A |
| 2,386,702 | 10/1945 | McBride | 105/282 |
| 2,816,780 | 12/1957 | Ross | 277/34 |
| 3,240,038 | 3/1966 | Schwegler | 277/34 |
| 3,296,980 | 1/1967 | Fritz | 251/305 |
| 3,354,918 | 11/1967 | Coleman | 141/363 |
| 3,704,722 | 12/1972 | Coleman | 251/203 |
| 3,809,361 | 5/1974 | Pfundstein et al. | 251/305 |
| 4,086,806 | 5/1978 | Coves et al. | 277/34 |
| 4,136,621 | 1/1979 | Schuller et al. | 105/308 E |
| 4,246,918 | 1/1981 | Dean | 251/305 |
| 4,265,426 | 5/1981 | Thurston et al. | 251/306 |
| 4,295,430 | 10/1981 | Knippel et al. | 105/308 E |

FOREIGN PATENT DOCUMENTS

| | | | |
|---|---|---|---|
| 669639 | 9/1963 | Canada | 105/248 |
| 857652 | 9/1940 | France . | |
| 530865 | 12/1940 | United Kingdom . | |
| 1263022 | 2/1972 | United Kingdom . | |

Primary Examiner—Joseph J. Rolla
Assistant Examiner—Kenneth Noland
Attorney, Agent, or Firm—Jack M. Wiseman

[57] ABSTRACT

A container for storing and discharging bulk material is provided with a bottom closure that includes both a butterfly valve and a sliding door, and provides an upwardly movable seal member and means on all four sides of the discharge passage for receiving the seal member in sealing engagement.

6 Claims, 10 Drawing Figures

CONTAINER WITH BUTTERFLY VALVE

BACKGROUND OF THE INVENTION

Containers are presently in use in which bulk granular material is transported and stored. These containers are generally provided with a discharge mechanism at their lower end through which material is discharged into a hopper or other receptacle. In one type of container, the discharge mechanism consists chiefly of a sliding door which is slid from under the stored material to allow it to drop out of the container, and is subsequently slid inwardly to stop the downward flow. Such a container is disclosed in the patent to Coleman U.S. Pat. No. 3,354,918 in which the sliding door is moved inwardly and outwardly of the container through a slot in one side wall of the container. When the door is in its inward position, it is raised bodily upwardly a short distance until its upper peripheral edge surface engages a sealing gasket on the container. This type of sliding door discharge mechanism is generally satisfactory but it has been found that, as the door is slid outwardly during the discharging operation, dust is forced upwardly from the receiving hopper and expelled out of the container through the slot into the working area. Some efforts have been made to overcome this problem. For example, the Coleman U.S. Pat. No. 3,704,722 discloses a mechanism wherein a cam-actuated bracket is raised across the slot into sealing engagement with a gasket to close the slot when material is to be discharged from the container. Borger U.S. Pat. No. 3,182,954 discloses a mechanism for sliding the door to open position which includes a plate that allegedly fills the slot. The present invention provides a new mechanism for preventing undesirable discharge of dust into the working area, namely a butterfly valve that is effective to hold material in the container until the sliding door has been completely opened and the slot has been sealed off from communication with the discharge passage. It is therefore an object of the present invention to provide an improved discharge machanism which will permit the discharge of material while substantially eliminating the escape of dust into the surrounding atmosphere.

SUMMARY OF THE INVENTION

A container discharge mechanism includes a sliding door movable across the discharge opening of the container, and a butterfly valve mounted in the discharge opening on the upstream side of the sliding door.

DESCRIPTION OF A PREFERRED EMBODIMENT

Figure 1:
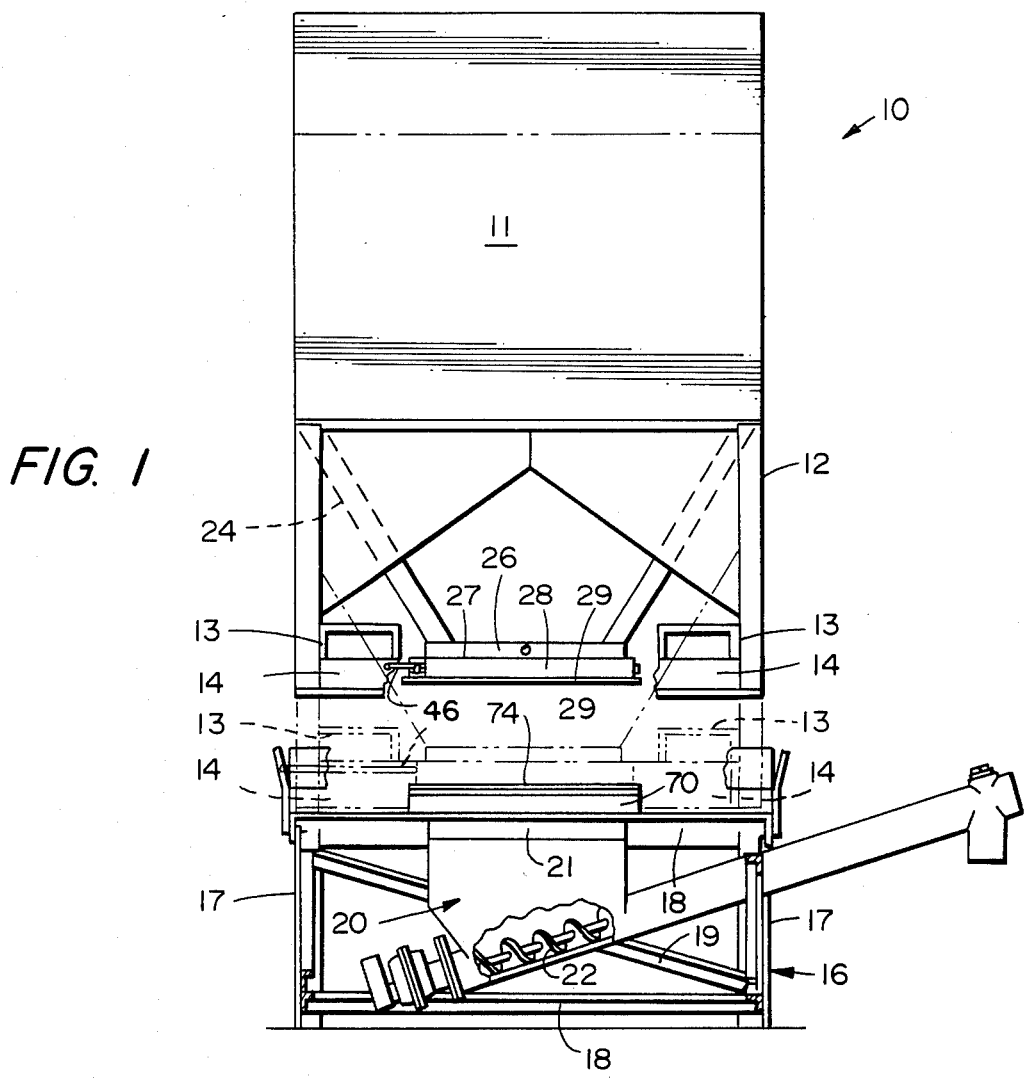
FIG. 1 is a diagrammatic elevational view showing a container, which incorporates the discharge mechanism of the present invention, spaced above a stand that is adapted to receive the container.

In FIG. 1 the reference numeral 10 indicates generally a container which is used for storing and transporting a variety of bulk materials. The container includes an upper bin section 11 that is of circular or of rectangular cross-section (as shown) and is secured to a rigid frame that is welded to the upper ends of four posts 12 (two only being shown) the lower ends of which rest, during the discharge of material, on a support stand 16. The stand includes a rigid frame structure which has sockets formed on its upper four corners arranged to receive the lower ends of the posts 12. The frame includes interconnected vertical, horizontal, and angled rigid structural members 17, 18 and 19 respectively, which are welded together to form a support for a vertically oriented hopper 20 that is mounted centrally of the frame 16 and is arranged to direct material, as it is discharged from the bin, onto an unloading conveyor 22. The hopper 20 comprises a rigid upper end section 21 that is rectangular in configuration and is formed by four angle members secured together. A pair of spaced flanges 21a and 21b (FIG. 2) of section 21, overlie and are welded to a pair of spaced structural members 18, and four walls 21c-21f extend downwardly from section 21 and form the upper end of the hopper. The front wall of the hopper is generally vertical but the side and rear walls can be inclined to direct the material onto the conveyor 22. If desired, the walls of the chute can be arranged to discharge material directly downwardly onto the ground or onto any material-receiving surface therebelow.

In addition to the four posts 12, the structure that supports the bin 11 includes two downwardly-opening channels 13 and two downwardly-opening channels 14 (one only being shown) at right angles to channels 13, all four channels being welded to the four corner posts 12. These channels provide sockets into which the forks of a forklift can be placed for the purpose of maneuvering the container. A funnel section 24, that is formed integral with the upper bin section 11 to define a chute having inwardly and downwardly inclined walls and a rectangular throat section 26 (FIG. 2), formed near its lower end. A short wall 27 projects outwardly from all four sides of the lower end of the throat, and a skirt 28 extends downwardly from the peripheral edges of the wall 27. A flange 29 extends outwardly from the lower edges of the skirt 28. As will be described presently the wall 26 defines a housing for a butterfly valve and the wall 28 provides a housing for a slidable closure door.

A butterfly valve 35 (FIGS. 2 and 3), which consists of two rectangular steel plates 36 and 37 welded to opposite side surfaces of a tubular metal member 38, is disposed in the passage formed by the throat section 26. The tubular member 38 is closed at each end by a cylindrical insert 39 that is secured by a removable pin 40 to the inner wall of the member 38. Each insert has a cylindrical section 39a that has a longitudinal centerline which is in alignment with the axis of member 38. Tubular bearings 41 are secured to the outer side of opposite walls of the throat 26 to receive and rotatably journal the end sections 39a of the member 38. At one end of member 38, the insert 39 has an end 39b of square cross-section adapted to receive a removable crank. If desired, a neoprene or metal washer 42 or O-ring can be disposed around each end section 39a between the shaft 38 and each of the walls of the throat 26.

Inwardly-directed V-shaped angles 43 are welded to the inner surfaces of the four walls of the throat in the path of movement of the outer edges of the plates 36 and 37. The edges of the plates 36 and 37 are tapered so that they closely engage the confronting inner edges of the angles 43 when they are moved into contact with the angles during movement to a throat-closing position. The angles may be made of steel or of a depressible material such as rubber. Alternately the plates 36 and 37 may be coated with a material, such as rubber, that would make sealing contact with the angles 43.

An abutment member 45 (FIG. 3) extends downwardly from the plate 37 and is provided with a lower edge 45a adapted to be engaged by a closure door 46, which will be described presently, and cammed upwardly to lock the butterfly valve 35 in closed position.

A sealing gasket 50 extends completely around the opening below the throat 26 and is bonded to the upper-surface of the flange 27 or loosely supported in position under flange 27 by the four walls 28.

Figure 5:
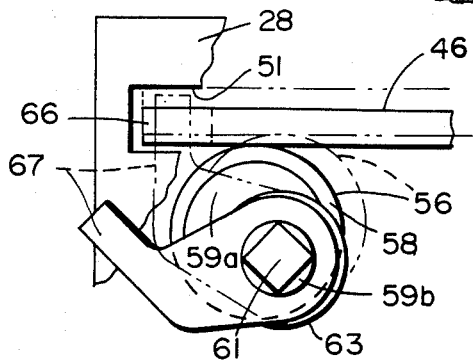
FIG. 5 is an enlarged view of a portion of FIG. 2, particularly showing the eccentricity of the cams.
Figure 6:
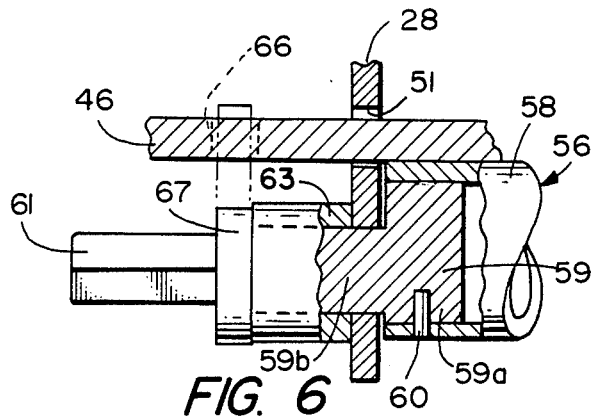
FIG. 6 is an enlarged view of a portion of FIG. 3, with parts broken away and parts shown in section.
Figure 2:
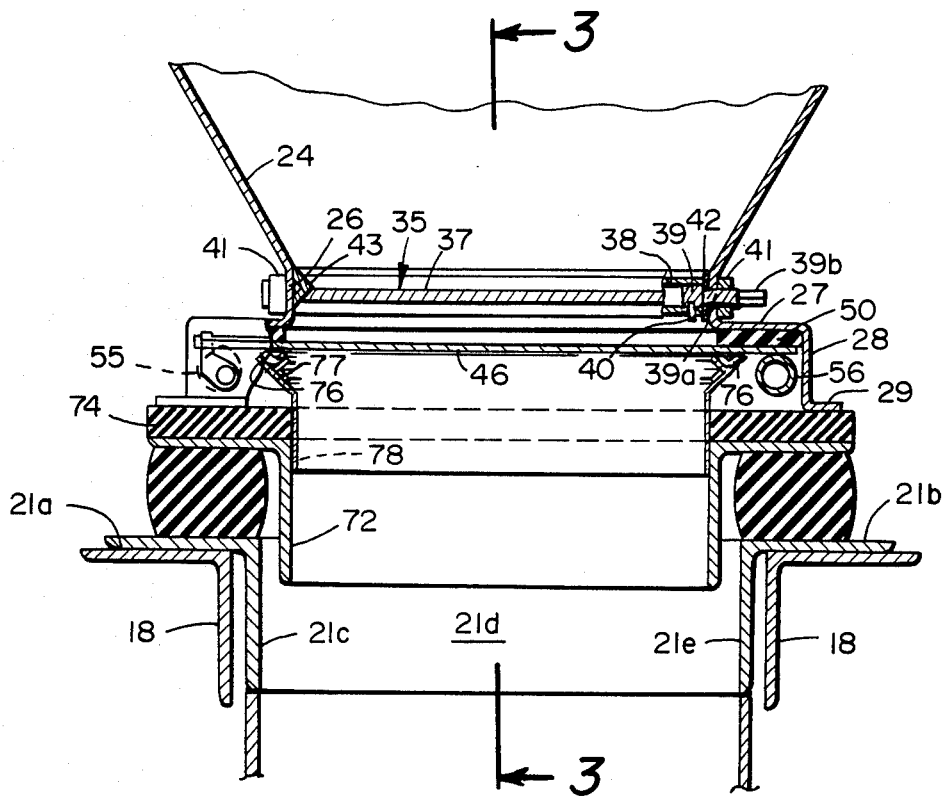
FIG. 2 is an enlarged fragmentary diagrammatic side elevation, with parts broken away and parts shown in section, of the discharge mechanism of FIG. 1 after the container has been positioned on the stand.
Figure 3:
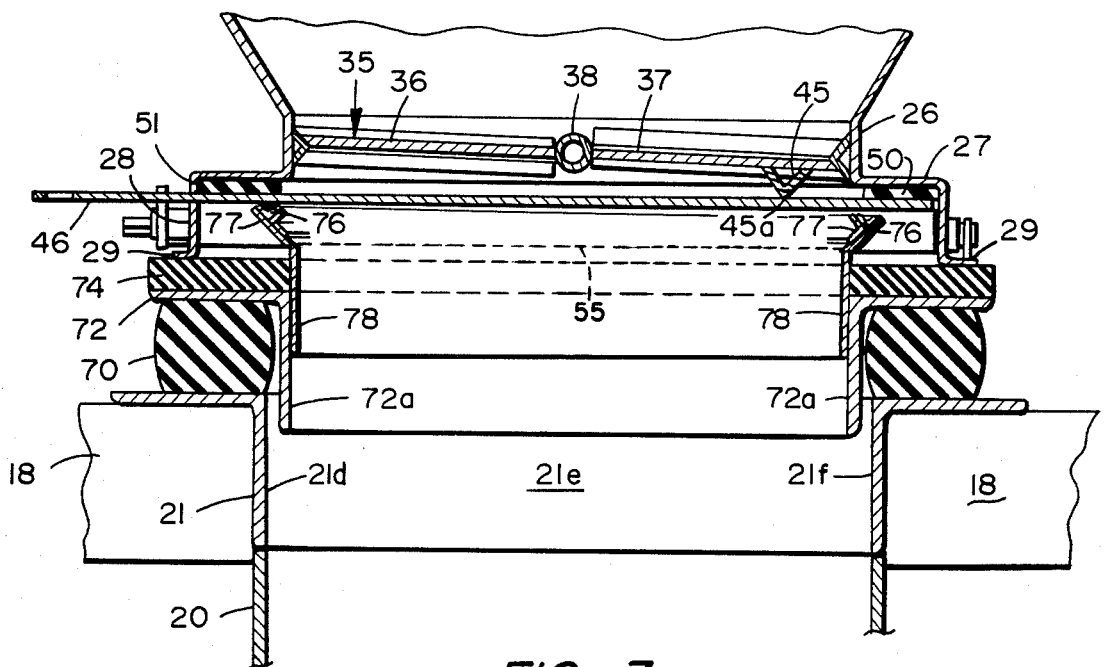
FIG. 3 is an enlarged diagrammatic side elevation of the container at the discharge area, the view being taken looking in the direction of arrows 3—3 of FIG. 2 and being partly broken away and partly in section to show the mechanism.

As seen in FIG. 3, after the butterfly valve is closed, the large rectangular closure door 46 may be slid in a direction transverse to the member 38 through an opening or slot 51 in one of the walls 28 into position under the butterfly valve. From this position, the door is moved up into sealing engagement with the seal gasket 50 by means of a pair of elongate cams 55 and 56 (FIG. 2) which are tubular in cross-section and are positioned at right angles to member 38. The cams are identical and, as seen in FIGS. 5 and 6, each cam comprises an elongated cylindrical tube 58 having an insert 59 secured in the tube by a removable pin 60. Each insert 59 has a first cylindrical section 59a snugly engaging the inner wall of the tube 58 and a second cylindrical section 59b of reduced diameter, with the axes of the two sections 59b being in axial alignment with each other and both being parallel to but offset from the axis of the tube 58 itself. The reduced diameter sections 59b extend through openings in opposed walls 28 and are rotatably journalled in aligned tubular bearings 63 secured to the outer surfaces of the walls. Section 59b at one end of tube 58 has an extension 61 of square cross-section. It will be evident that, when removable cranks having square sockets are placed on the shaft extensions 61, the cams can be rotated to force the door 46 upward against the seal 50.

A notch or cutout 66 may be provided in one or both side edges of the door 46 near its trailing edge, and a locking lug 67 (FIG. 5) can be arranged to be moved upwardly and laterally into each notch, incident to rotation of either or both of the cams 55 and 56, to prevent the door from moving rearwardly after it has been slid into place over the cams 55 and 56. Each lug has a hub portion disposed on the end 61 of the cam shaft in keyed relation.

Referring to FIG. 3, it will be seen that as mentioned above, the rigid member 21 of the hopper 20 is made of angle members secured together to define a rectangular opening, and that the upper ends of the walls that form the remainder of the hopper are secured to the lower ends of the member 21. A spring 70 of resilient impervious material, such as a foamed rubber, natural or synthetic, has the same rectangular configuration as the upper flanges of member 21 and is bonded by a suitable adhesive to the upper surface of that member. A second rigid member 72, that also has an upper flange of rectangular configuration, is made up of interconnected angle bars and is oriented on the spring 70 so that the four downwardly extending flanges 72a of the angles project into the opening defined by the frame member 21. A compressible resilient seal member 74 is bonded around the upper surface of the member 72 in position to be engaged by the flange 29 encircling the lower end of the closure door housing 28.

In use, when material is stored in the bin 10, the butterfly valve 35 is in the closed position of FIG. 3 with the edges of the valve plates 36 and 37 in sealed engagement with the angles 43 on the walls of the throat section of the bin. The door 46 has been slid into position under the throat section and the cams 55 and 56 have been rotated to raise the door into sealed engagement with the seal member 50. During this upward movement, the door 46 engages the projection 45 on the underside of valve plate 37 and exerts an upward pressure on the plate. The seal member 50 yields to permit the door to be raised a short distance, thus assuring the sealing engagement of the butterfly valve with the angle member 43. The locking lugs 67 have been swung up into the notches 66 in the side edges of the door to prevent the opening of the door.

Figure 4:
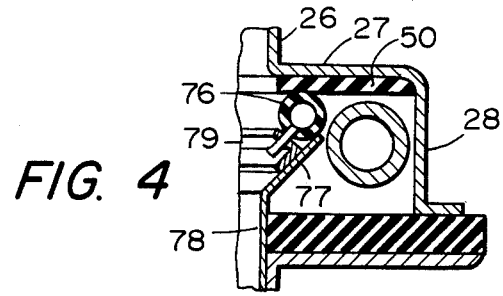
FIG. 4 is an enlarged sectional view of a portion of FIG. 2 with door open.

During the discharge of material from the container, especially at the initial drop of material into the hopper 20, dust is forced back upwardly toward the valve and, unless means is provided for preventing it, dust will be forced out of the container through the slot 51. In the embodiment of FIGS. 1-3, means in the form of an inflatable rubber tube 76 that has a rectangular configuration conforming to the configuration of the underside of the seal member 50 and is disposed in a similarly-shaped, upwardly-opening, support member 77. The member 77 is formed on the upper end of a four-sided support wall 78 that is welded to and projects from the spring-supported member 72. In FIGS. 2 and 3 the inflatable tube 76 is shown in a deflated condition wherein its upper surface is below the level of the underside of the closure door 46 to prevent interference with the opening and closing of the door. In FIG. 4, the tube 76 has been inflated and its upper surface has been moved into sealing engagement with the gasket 50 after the door 46 has been withdrawn. The connection of the tube 76 with a source of air under pressure is effected through a conventional air valve 79 (schematically shown in FIG. 4) that is connected into a side wall of the tube and projects downwardly through an opening in the support member 77 for connection to a pressurized air conduit.

When material is to be discharged, the locking lugs are withdrawn from the notches and the door is lowered away from the seal member 50 by rotation of the cams 55 and 56. The door is then slid outwardly from under the butterfly valve. The tube 76 is then inflated to engage the gasket 50 and isolate the discharge passage from the slotted housing of the closure door. A removable crank is then engaged on the end 39b of the valve shaft 38, and the crank is rotated to swing the valve clockwise (FIG. 3) to open position. When the butterfly valve is opened, material is discharged down into the hopper 20 and taken away by the conveyor 22.

Figure 7:
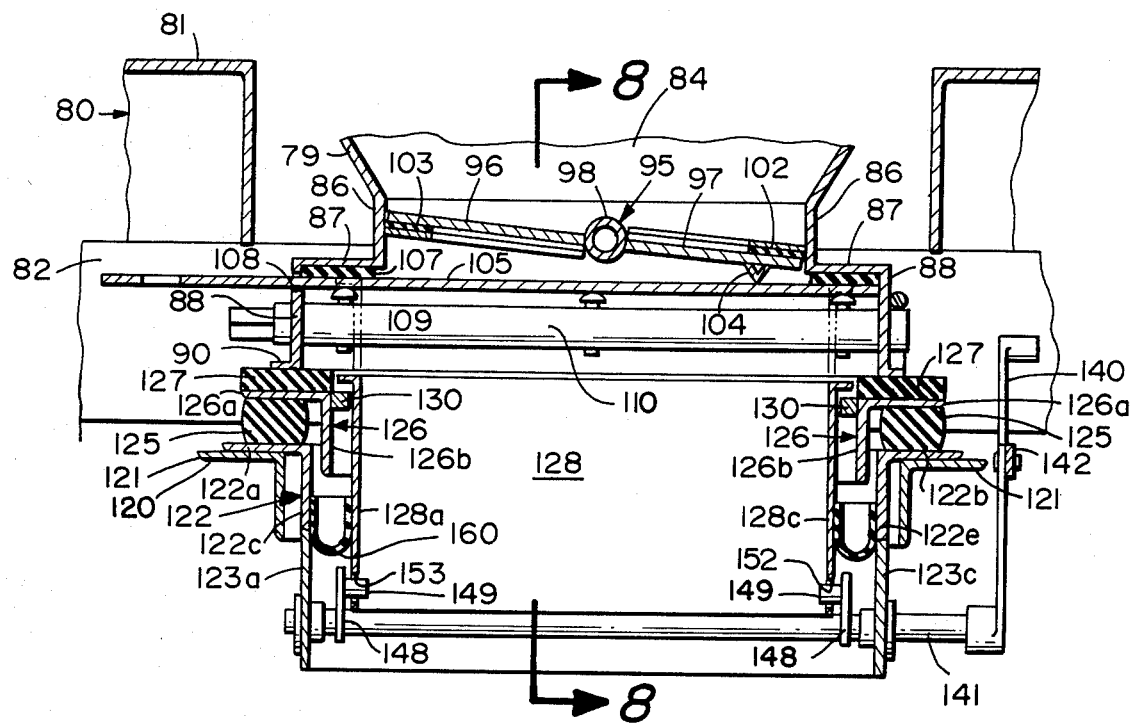
FIG. 7 is a fragmentary diagrammatic vertical section similar to FIG. 2, the view being taken looking generally in the direction of arrows 7—7 of FIG. 8 and showing a second embodiment of the discharge mechanism of the present invention.
Figure 8:
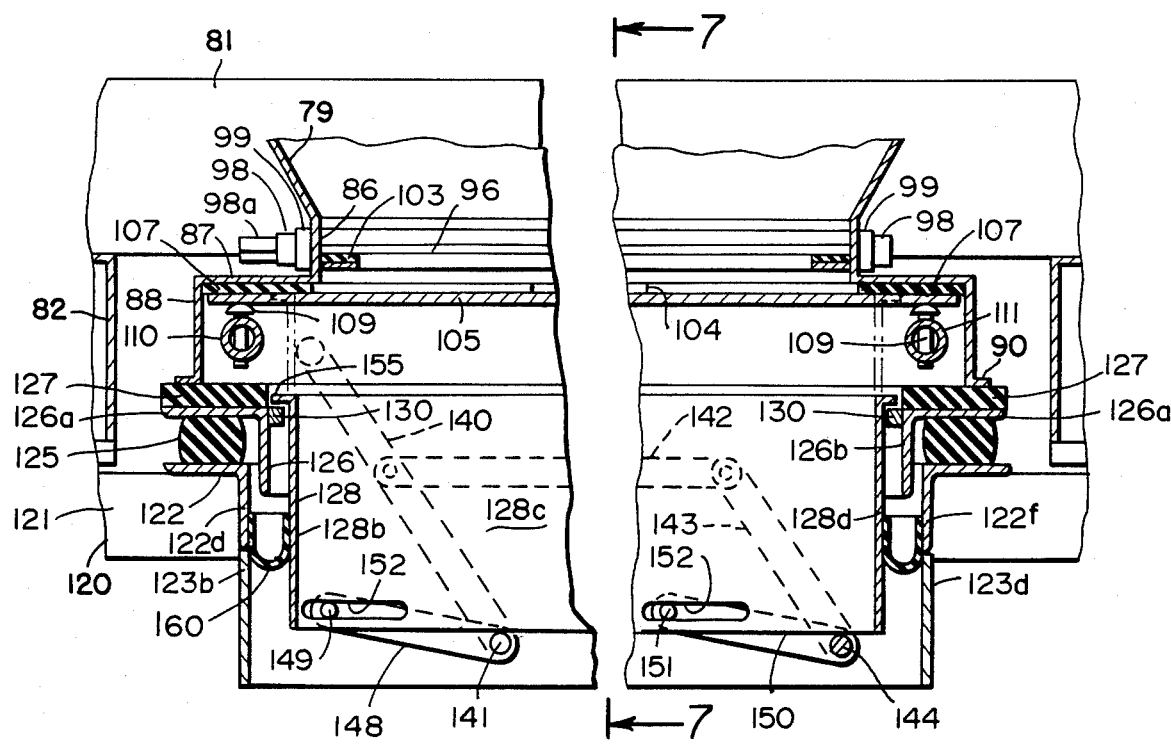
FIG. 8 is a fragmentary section taken along line 8—8 of FIG. 7.

In FIGS. 7 and 8, a second embodiment of the dust control mechanism of the present invention is illustrated. In this embodiment a container 79 which has a frame support structure 80 that is substantially identical to the structure of FIG. 1, and includes two downwardly-opening channels 81 and two channels 82, channels 81 being disposed at right angles to channels 82. A bin section 84 of the container has an inwardly tapered lower section with a rectangular throat formed near its lower end. The throat is defined by four depending walls 86, and a horizontal flange 87 is formed integral with and projects outwardly from the lower ends of the walls 86. A skirt 88 extends downwardly from the lower edges of the flange 87, and a second horizontal flange 90 extends outwardly from the lower edge of skirt 88.

A butterfly valve 95, which consists of two rectangular metallic plates 96 and 97 welded to diametrically-opposite edges of a tubular shaft member 98, is disposed in the rectangular throat section defined by the four walls 86. The shaft 98 extends through openings in the walls 86 and is journalled for rotation in aligned bearings 99 on the walls in the same manner as the member 38 of the butterfly valve of FIG. 1 is journalled in bearings on the walls 26 in FIG. 2. The member 98 is provided with an end portion 98a of square cross-section (FIG. 8) which is adapted to receive a socket of a removable crank (not shown). The outer peripheral edges of the plates 96 and 97 are cut at an angle as shown by the outer edge of plates 96 in FIG. 7 so that, when the valve is rotated counter-clockwise (FIG. 7), the edges of the plates will move into tight engagement with the walls 86 or to an attachment thereto. Under certain conditions a flat neoprene gasket 102 is affixed or bonded to three sides of the undersurface of valve plate 96. In one arrangement, shown by the outer edge of plate 97 (FIG. 7), the outer edges of the gaskets are positioned to extend slightly past the side and end edges of the plates 96 and 97. An abutment member 104 is secured to and projects downwardly from the undersurface of plate 97.

When the butterfly valve is in the closed position of FIG. 7, a large rectangular closure door 105 can be slid through a slot 108 in one of the walls of the skirt 88 to a position under the valve. From this position, the door is moved upwardly into sealing engagement with a gasket 107, that is secured to the undersurface of the horizontal flange 87, by means of six camming elements 109 which are in the form of rivets. Three of the camming elements 109 are secured in each of two parallel tubular shafts 110 and 111 with the rounded end of each rivet facing away from the associated shaft. Each of the shafts has its end portions journalled for rotation in openings in the skirt 88, and one end of each shaft has a section of square cross-section which is adapted to receive the socket of a removable crank.

A stand 120 on which the container 79 is deposited before the sliding door and the butterfly valve are opened, is substantially identical to the stand 16 of FIG. 1 and includes a pair of spaced horizontal angles 121 (FIG. 7) that provide a rigid support for a hopper 122. The hopper is made up of four angles welded together in rectangular formation and provides a pair of horizontal flanges 122a and 122b on opposite sides of the hopper that overlie and are welded to the angles 121, and four downwardly-extending inner flanges 122c–122f. Four walls 123a–123d are welded to and extend downwardly from the inner flanges 122c–122f respectively to confine material as it is discharged from the container and, if desired, they may be inclined as in FIG. 1 to direct the material onto a conveyor. A spring 125 of resilient impervious material, such as natural or synthetic foamed rubber, has the same configuration as a portion of the upper surface of the four upper flanges of the hopper 122 and is bonded by a suitable adhesive to that surface. A rigid rectangular frame 126, made up of four angles welded together, has four horizontal flanges 126a that rest on the upper surfaces of the four sides of spring 125, and four vertical flanges 126b that extend downwardly inside the upper end of the hopper. A compressible resilient seal member 127 is bonded to the four horizontal flanges 126a in position to be engaged by the flange 90 of the container 79.

A dust-sealing member 128, which is movable up and down in the hopper 122, comprises four flat plates 128a–128d that are welded together to form a box-like structure that is open at its upper and lower ends. The member 128 is guided in its vertical movement from the inner face of the vertical flanges 126b. Upward movement of the sealing member 128 is brought about by a lever 149 (FIG. 7) which is keyed to a shaft 141 that is journalled for rotation in a pair of the opposed side walls of the hopper 122. One end of a link 142 is pivotally connected to the lever 140 at a point intermediate the ends of the lever. The other end of the line 142 is pivotally connected to a lever 143 that is keyed to a shaft 144 which is also rotatably journalled in the side walls of the receptacle. Two levers 148 (FIG. 7), each of which carries a roller 149 at its outer end, are keyed to shaft 141, and two levers 150 (one only being shown in FIG. 8), each of which carries a roller 151 at its outer end, are keyed to shaft 144. One of each of the rollers 149 and 151 engages the lower edge of one of two slots 152 in plate 128c (FIG. 7) and one of each of the rollers engages the lower edge of one of two slots 153 (one only being shown) in plate 128a of the sealing member. Since the actuating levers 140 and 143 are connected together by the link 142, angular movement of lever 140 in a clockwise direction, FIG. 8, when the closure door 105 is withdrawn, causes the rollers 149 and 151 to raise the sealing member 128 until an outwardly turned flange 155, extending around the upper end of the sealing member, engages the gasket 107. The length of each of the levers 148 and 150 is chosen so that, when the main lever 140 is pivoted through a predetermined angular distance, the levers 148 and 150 are in a substantially upright over-center position and the flange 155 effectively contacts the gasket 107 in sealing engagement.

When the lever 140 is pivoted counterclockwise (FIG. 8) the rollers 149 and 151 engage the lower walls of slots 152 and 153 to positively move the sealing member 128 downwardly to the FIG. 8 position.

To prevent the passage of material upwardly between the hopper 123 and the sealing member 128 during the discharge of material from the container, a closure member 160 of flexible material is secured between the entire periphery of the dust-sealing member 128 and the inner surface of the fixed hopper 122.

While the two embodiments of the dust-seal member disclosed above are mounted on the stand and are arranged to move upwardly to engage the hopper, such mechanisms could be mounted on the hopper so that, upon actuation, they would move downwardly to sealingly engage the stand.

Figure 9:
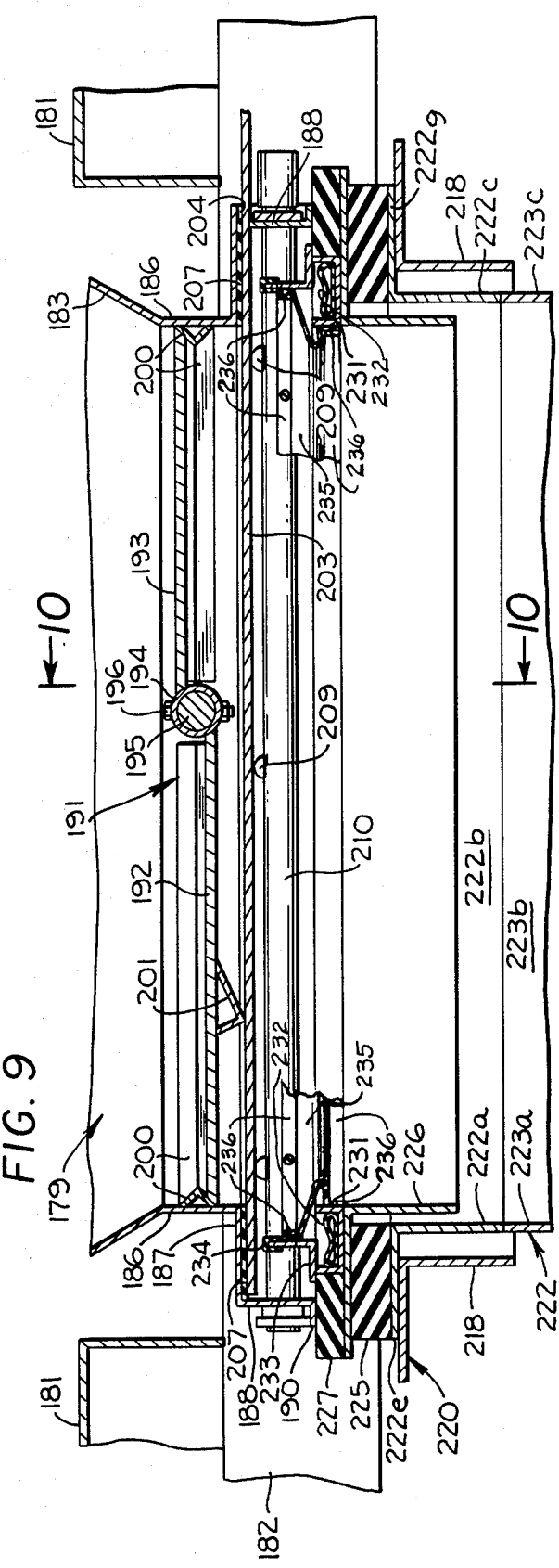
FIG. 9 is a fragmentary diagrammatic vertical section similar to FIG. 2, the view being taken looking generally in the direction of arrows 9—9 of FIG. 10 and showing a further embodiment of the dust control mechanism of the present invention.
Figure 10:
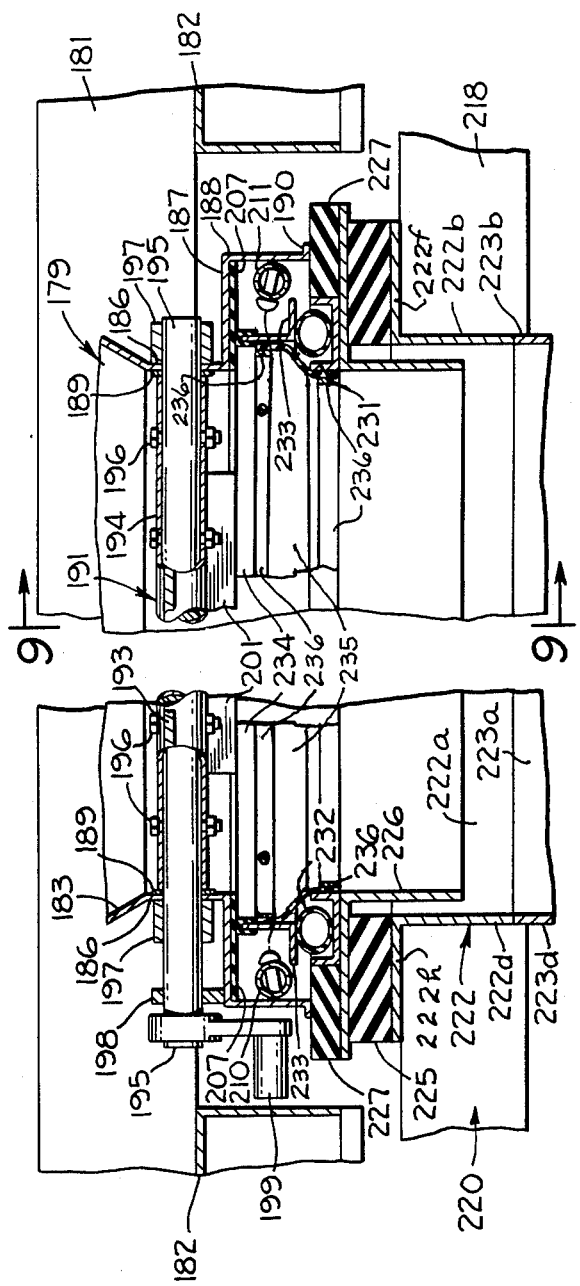
FIG. 10 is a fragmentary section taken generally along line 10—10 of FIG. 9.

In FIGS. 9 and 10 a further embodiment of the dust control mechanism of the present invention is illustrated. In this embodiment a container 179 which has a frame support structure that is substantially identical to the support structure of FIG. 1 and includes two downwardly-opening channels 181 and two channels 182, the channels 181 being oriented at right angles to channels 182. A tapered bin section 183 of container 179 has a rectangular throat formed near its lower end. The throat is defined by four depending walls 186, and a horizontal flange 187 is formed integral with and projects outwardly from the lower ends of the walls 186. A skirt 188 extends downwardly from the lower edges of flange 187, and a second horizontal flange 190 extends outwardly from the lower edge of skirt 188.

A butterfly valve 191, which consists of two rectangular metal plates 192 and 193 welded to opposite sides of a tube 194, is disposed in the rectangular throat section defined by the four walls 186. A drive shaft 195 passes through the tube 194 and is secured thereto by bolts 196. The shaft extends through openings in two opposed walls 186 and is journalled for rotation in tubular sleeves 197, secured to the outer sides of the walls 186, and in a support post 198. The shaft is provided with an end portion of square cross-section which is adapted to receive the socket of a removable crank 199.

Inwardly-directed V-shaped angles 200 are welded to the inner surfaces of the four walls 186 of the throat in the path of movement of the outer edges of the plates 192 and 193. The edges of the plates may be beveled at an angle so that they closely engage the confronting slanted sides of the angles 200 when the valve plates are moved toward throat-closing position. The angles may be made of steel or of a depressible material such as rubber. Alternately, the plates 192 and 193 may be coated with a material, such as rubber, that would make sealing contact with the angles 200. An abutment member 201 extends downwardly from plate 192.

When the valve is in the closed position of FIG. 9, a large flat rectangular closure door 203 can be slid through a slot 204 in one of the side walls 188 to a position under the valve. From this position, the door is moved bodily upwardly into sealing engagement with a gasket 207, that is secured to the undersurface of the horizontal flange 187, by means of six camming elements 109 which are in the form of rivets. Three of the camming elements are secured in each of two parallel tubular shafts 210 and 211 with the rounded end of each rivet facing away from the shaft. Each of the shafts has its end portions journalled for rotation in openings in the side walls 188, and one end of each shaft has a section of square cross-section which is adapted to receive the socket of a removable crank.

A stand 220 on which the container is deposited before the sliding door and the butterfly valve are opened, is substantially identical to the stand 16 of FIG. 1 and includes a pair of spaced horizontal angles 218 which provide rigid support for a hopper 222. The upper end of the hopper is made up of four angles welded together in rectangular formation to provide an upper end which includes four downwardly-extending flanges 222a–222d and four horizontal flanges 222e–222h that overlie and are welded to the stand 220. The hopper also includes four walls 223a–223d that are welded to and extend downwardly from the vertical flanges 222a–222d, respectively, to confine material as it is discharged from the container. A spring 225 of resilient impervious material, such as natural or synthetic foamed rubber, has the same configuration as a portion of the upper surface of the four upper flanges of the hopper and is bonded by a suitable adhesive to that surface. A rigid rectangular frame 226, made up of four angles welded together, has four horizontal flanges that rest on the spring 225 and four vertical flanges that extend downwardly inside the upper end of the hopper. A compressible resilient seal member 227 is bonded to the four horizontal flanges of the frame 226 in position to be engaged by the flange 190 of the container.

The dust control member of FIGS. 9 and 10 includes a rectangular frame made up of four upwardly-opening channels 231 that are welded together to form a trough in which an inflatable tube 232 of rectangular configuration is disposed. A rectangular lift frame 233, consisting of four angles welded together, is disposed above the tube 232. At the time that the butterfly valve is closed and the sliding door 203 is in place under the valve, the tube 232 is in the deflated condition of FIG. 9 and the lift frame 233 rests on the channel frame. When the door 203 has been withdrawn, and before the butterfly valve is moved to open position, the tube is inflated and, during the inflation, the tube engages the underside of the lift frame 233 and raises it into engagement with the gasket 207. A closure member 235 of flexible material is secured by metal straps 236 to all four of the inner sides of lift frame 233 and to the four inner sides of the channel member 233. This member is similar to and functions for the same purpose as the closure member 160 of FIGS. 7 and 8.

Then, when the butterfly valve is opened and material is discharged downwardly through the hopper, any dust or the like that tends to move back upwardly is confined and cannot escape into the surrounding environment.

From the foregoing description it will be apparent that the present invention provides a discharge mechanism for a container whereby the material may be discharged without the excessive expulsion of dust. The butterfly valve provides a primary material control member that makes it possible to slide the door out of position without causing material to flow. Further, the unique upwardly-moving seal member assures positive sealing around the discharge passage of the container.

I claim as my invention:

1. A container for material comprising an upright housing having a discharge area near its lower end section and walls defining a discharge passage extending vertically through said area, a door supported by said walls and movable across said passage from a closed position in the passage to a withdrawn position, a butterfly valve pivotally mounted in said housing at said discharge area at a point above the path of movement of said door as it slides across the passage, a generally horizontal ledge on said housing at said discharge area directly above the path of movement of said door, a downwardly-facing seal member on said ledge, cam means for raising said door into sealing engagement with said seal member, and an abutment on the lower surface of said valve in the path of upward movement of said door to be engaged thereby and moved upwardly during movement of said door to sealed engagement with said member.

2. In combination,
(A) a container for material comprising:
  (a) an upright housing having a discharge area near its lower end section and walls defining a discharge passage extending vertically through said area,
  (b) a door supported by said walls and movable across said passage from a closed position in the passage to a withdrawn position, and
  (c) a butterfly valve pivotally mounted in said housing at said discharge area at a point above the path of movement of said door as it slides across the passage; and
(B) a stand adapted to support said housing during discharge of material from said housing, said stand comprising:
  (a) a hopper closed on all sides and open at its top to form a continuation of the walls of the housing that define said discharge passage,
  (b) a sealing gasket mounted in said housing, and
  (c) seal means having a member movable between said housing and said hopper in the area close to said walls to engage said gasket to isolate said walls from the discharge passage whereby material in the passage will not contact said walls, said movable member including a portion of an inflatable tube mounted in said hopper and having a portion movable upwardly into engagement with said gasket when said door is in the withdrawn position.

3. The combination of claim 2 wherein said hopper includes a rigid member secured to said hopper and having an upwardly-opening trough receiving said inflatable tube.

4. In combination,
(A) a container for material comprising:
  (a) an upright housing having a discharge area near its lower end section and walls defining a discharge passage extending vertically through said area,
  (b) a door supported by said walls and movable across said passage from a closed position in the passage to a withdrawn position, and
  (c) a butterfly valve pivotally mounted in said housing at said discharge area at a point above the path of movement of said door as it slides across the passage; and
(B) a stand adapted to support ssaid housing during discharge of material from said housing, said stand comprising:
  (a) a hopper closed on all sides and open at its top to form a continuation of the walls of the housing that define said discharge passage,
  (b) a sealing gasket mounted in said housing, and
  (c) seal means having a member movable between said housing and said hopper in the area close to said walls to engage said gasket to isolate said walls from the discharge passage whereby material in the passageway will not contact said walls, said seal means comprising a rigid box-like sealing member disposed inwardly of the walls of said hopper, lever means mounted in said hopper, and means connecting said lever means in operative engagement with said sealing member for raising said sealing member into sealing engagement with said gasket when said door is in withdrawn position.

5. The combination of claim 4 wherein said lever means includes a plurality of levers, and a roller at one end of each lever, and wherein said operative connection between said sealing member and said lever means includes a plurality of horizontal slots in the walls of said box-like sealing member, each slot being adapted to receive one of said rollers.

6. A container for material comprising an upright housing having a discharge area near its lower end section and walls defining a discharge passage extending vertically through said area, a sliding door supported by said walls for sliding movement and movable across said passage from a closed position in the passage to a withdrawn position, a butterfly valve pivotally mounted in said housing at said discharge area at a point above the path of movement of said door as said door slides across the passage, a stand adapted to support said housing during discharge of material from the housing, said stand comprising a hopper closed on all sides and open at its top to form a continuation of the walls of the housing that define said discharge passage, a sealing gasket mounted in said housing, seal means having a member movable between said housing and said hopper in the area close to said walls to engage said gasket to isolate said walls from the discharge passage whereby material in the passage will not contact said walls, said hopper including an upwardly-opening trough and wherein said movable member including an inflatable tube disposed in said trough, and a lift member disposed in said hopper above said tube, inflation of said tube being effective to raise said lift member into engagement with said gasket.

* * * * *